US012030741B2

(12) United States Patent
Scoville

(10) Patent No.: US 12,030,741 B2
(45) Date of Patent: Jul. 9, 2024

(54) PROCESSING MULTIPLE ELEVATOR SERVICE REQUESTS

(71) Applicant: OTIS ELEVATOR COMPANY, Farmington, CT (US)

(72) Inventor: Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1507 days.

(21) Appl. No.: 16/363,067

(22) Filed: Mar. 25, 2019

(65) Prior Publication Data

US 2020/0307951 A1 Oct. 1, 2020

(51) Int. Cl.

| | |
|---|---|
| ***B66B 1/46*** | (2006.01) |
| ***B66B 1/28*** | (2006.01) |
| ***B66B 1/34*** | (2006.01) |
| ***B66B 3/00*** | (2006.01) |

(52) U.S. Cl.

CPC ................ *B66B 1/468* (2013.01); *B66B 1/28* (2013.01); *B66B 1/3461* (2013.01); *B66B 3/002* (2013.01); *B66B 2201/103* (2013.01); *B66B 2201/4615* (2013.01); *B66B 2201/4653* (2013.01); *B66B 2201/4676* (2013.01); *B66B 2201/4684* (2013.01)

(58) Field of Classification Search

CPC ......... B66B 1/468; B66B 1/28; B66B 1/3461; B66B 3/002; B66B 2201/103; B66B 2201/4615; B66B 2201/4653; B66B 2201/4676; B66B 2201/4684; B66B 1/2408; B66B 1/06; B66B 1/3423; B66B 1/3446; B66B 5/0018; B66B 2201/20

See application file for complete search history.

(56) References Cited

U.S. PATENT DOCUMENTS

| | | | | |
|---|---|---|---|---|
| 5,975,247 | A | 11/1999 | Choi | |
| 2016/0244295 | A1 * | 8/2016 | Salmikuukka | B66B 1/2458 |
| 2020/0130987 | A1 * | 4/2020 | Scoville | B66B 1/468 |
| 2020/0239268 | A1 * | 7/2020 | Scoville | B66B 1/2458 |

FOREIGN PATENT DOCUMENTS

| | | | | |
|---|---|---|---|---|
| EP | 2653424 | A1 | 10/2013 | |
| EP | 3623331 | A1 * | 3/2020 | B66B 1/2458 |
| EP | 3643664 | A1 * | 4/2020 | B66B 1/06 |
| WO | 2018059677 | A1 | 4/2018 | |

OTHER PUBLICATIONS

Extended European Search Report for Application No. EP 19 21 9543 dated Aug. 6, 2020.

EP Official Action for application No. 19 219 543.6 mailed Sep. 20, 2023.

* cited by examiner

*Primary Examiner* — Jeffrey Donels

(74) *Attorney, Agent, or Firm* — Carlson, Gaskey & Olds, P.C.

(57) ABSTRACT

An illustrative example method of controlling an elevator system includes receiving a first request for elevator service from a requestor, receiving a second request for elevator service from the requestor while the first request is still pending, and controlling the elevator system to provide elevator service for only one of the first request or the second request.

20 Claims, 2 Drawing Sheets

PROCESSING MULTIPLE ELEVATOR SERVICE REQUESTS

BACKGROUND

Elevator systems have proven useful for carrying people among different levels within buildings. Over the years different technologies have been introduced allowing people to place calls or requests for elevator service. Some systems allow a passenger to place a request for elevator service using an input device that is located outside of the elevator cars. Such requests can include the intended destination of the passenger. A variety of dispatching algorithms are known for assigning elevator cars to such requests.

One challenge presented by such systems is that an individual may enter more than one request or call. For example, someone who places a call and receives information regarding which elevator car to board but then forgets the car assignment may place a second request. The elevator system will interpret the second request independently of the request previously made by the same person. This results in inefficiencies in car assignments. This type of scenario can particularly be a problem during peak travel times.

SUMMARY

An illustrative example method of controlling an elevator system includes receiving a first request for elevator service from a requestor, receiving a second request for elevator service from the requestor while the first request is still pending, and controlling the elevator system to provide elevator service for only one of the first request or the second request.

An example embodiment having one or more features of the method of the previous paragraph includes determining whether the first request or the second request corresponds to the desired elevator service of the requestor and controlling the elevator system to provide the desired elevator service of the requestor.

An example embodiment having one or more features of the method of any of the previous paragraphs includes determining whether the elevator service of the second request is different than the elevator service of the first request and either identifying the first request as the request that corresponds to the desired elevator service when the elevator service of the second request is the same as the elevator service of the pending request or obtaining additional input from the requestor identifying the desired elevator service.

In an example embodiment having one or more features of the method of any of the previous paragraphs, obtaining additional input from the requestor comprises prompting the requestor to indicate a selection of the elevator service of the first request or the elevator service of the second request and determining the desired elevator service based on the requestor making the selection.

In an example embodiment having one or more features of the method of any of the previous paragraphs, the elevator service of the second request is the same as the elevator service of the first request and the method comprises providing a confirmation for the requestor that confirms at least one characteristic of the first request.

In an example embodiment having one or more features of the method of any of the previous paragraphs, the at least one characteristic includes an indication of a destination and an indication of an elevator car assigned to the first request.

In an example embodiment having one or more features of the method of any of the previous paragraphs, the determining comprises prompting the requestor to select the elevator service corresponding to the second request or the first request and determining which elevator service the requestor selects in response to the prompting.

In an example embodiment having one or more features of the method of any of the previous paragraphs, the elevator service of the second request is different than the elevator service of the first request.

An example embodiment having one or more features of the method of any of the previous paragraphs includes identifying the requestor of the first and second request, respectively, based on identification information associated with the first and second request, respectively; and receiving the identification information as a prerequisite to the requestor being able to make the first request and the second request, respectively.

An example embodiment having one or more features of the method of any of the previous paragraphs includes assigning an elevator car to service the first request before receiving the second request and determining whether the first request is still pending when receiving the second request by determining whether elevator car assigned to service the first request has arrived at a boarding location of the requestor.

An illustrative example embodiment of an elevator system includes at least one input device configured to receive requests for elevator service and an elevator controller that is configured to: determine that the at least one input device has received a first request for elevator service from a requestor, determine that the at least one input device has received a second request for elevator service from the requestor while the first request is still pending, and control the elevator system to provide elevator service for only one of the first request or the second request.

In an example embodiment having one or more features of the system of the previous paragraph, the elevator controller is configured to determine whether the first request or the second request corresponds to the desired elevator service of the requestor and control the elevator system to provide the desired elevator service of the requestor.

In an example embodiment having one or more features of the system of any of the previous paragraphs, the elevator controller is configured to determine whether the elevator service of the second request is different than the elevator service of the first request and either identify the first request as the request that corresponds to the desired elevator service when the elevator service of the second request is the same as the elevator service of the pending request or obtain additional input from the requestor identifying the desired elevator service.

In an example embodiment having one or more features of the system of any of the previous paragraphs, the elevator controller is configured to obtain additional input from the requestor by prompting the requestor through the at least one input device to indicate a selection of the elevator service of the first request or the elevator service of the second request and determine the desired elevator service based on the requestor making the selection.

In an example embodiment having one or more features of the system of any of the previous paragraphs, the elevator service of the second request is the same as the elevator service of the first request and the at least one input device is configured to provide a confirmation for the requestor that confirms at least one characteristic of the first request.

In an example embodiment having one or more features of the system of any of the previous paragraphs, the at least one characteristic includes an indication of a destination and an indication of an elevator car assigned to the first request.

In an example embodiment having one or more features of the system of any of the previous paragraphs, the elevator controller is configured to determine the desired elevator service by prompting the requestor through the at least one input device to select the elevator service corresponding to the second request or the first request and determining which elevator service the requestor selects in response to the prompting.

In an example embodiment having one or more features of the system of any of the previous paragraphs, the elevator service of the second request is different than the elevator service of the first request.

In an example embodiment having one or more features of the system of any of the previous paragraphs, the elevator controller is configured to identify the requestor of the first and second request, respectively, based on identification information associated with the first and second request, respectively; and receive the identification information as a prerequisite to the requestor being able to make the first request and the second request, respectively.

In an example embodiment having one or more features of the system of any of the previous paragraphs, the elevator controller is configured to assign an elevator car to service the first request before receiving the second request and determine whether the first request is still pending when receiving the second request by determining whether elevator car assigned to service the first request has arrived at a boarding location of the requestor.

The various features and advantages of at least one disclosed example embodiment will become apparent to those skilled in the art from the following detailed description. The drawings that accompany the detailed description can be briefly described as follows.

DETAILED DESCRIPTION

Figure 1:
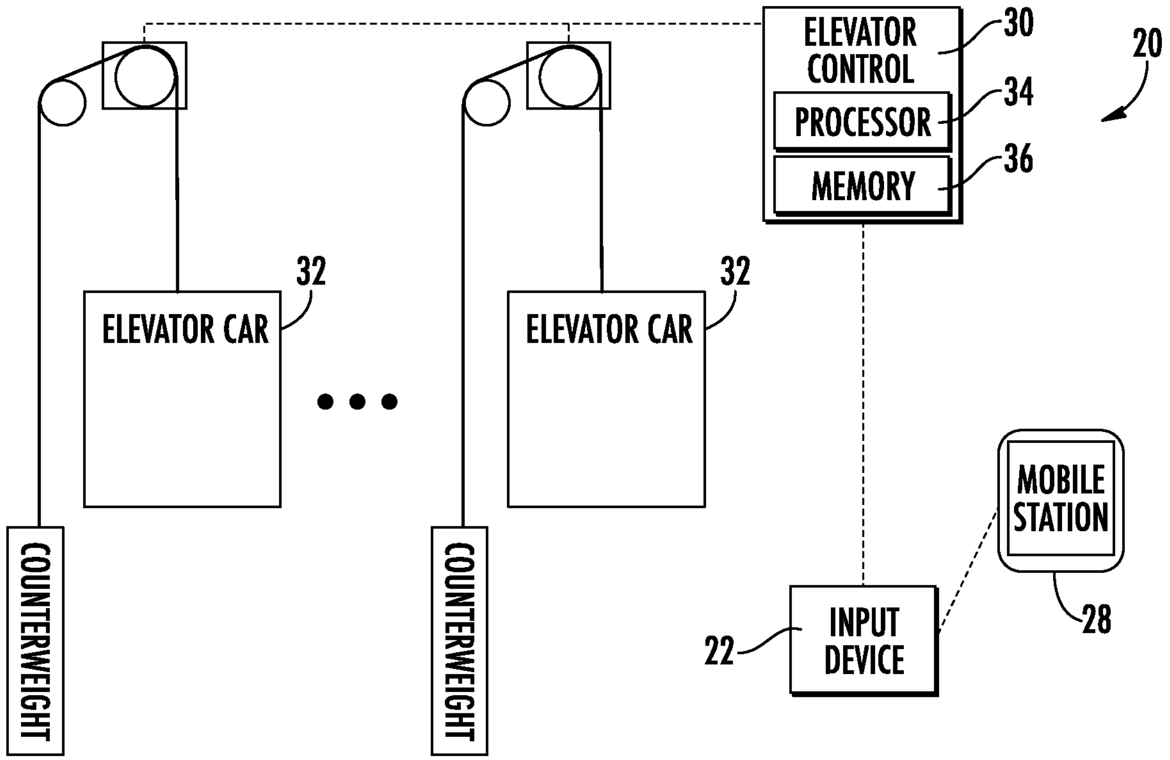
FIG. 1 schematically illustrates selected portions of an example elevator system.
Figure 2:
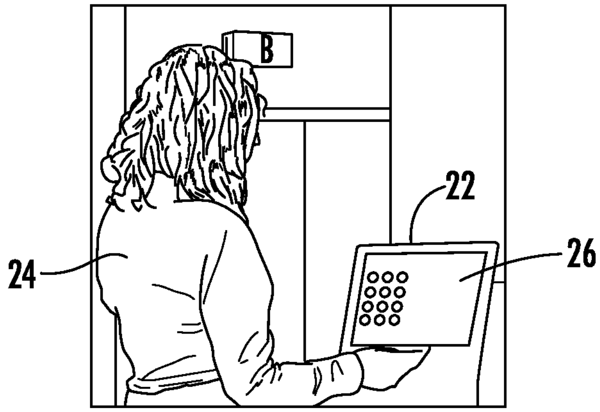
FIG. 2 schematically illustrates an example embodiment of an input device useful with the example elevator system of FIG. 1.

FIGS. 1 and 2 schematically illustrate selected portions of an elevator system 20. At least one input device 22 allows a requestor 24 to place a request or call for elevator service. The at least one input device 22 obtains information from the requestor 24 that identifies the requestor and includes an indication of the intended destination of the requestor 24.

The input device 22 in some embodiments includes a user interface 26 that allows the requestor 24 to input information regarding a request for elevator service including the intended destination. The input device 22 in such embodiments may be a dedicated destination entry device or integrated into a building security system.

In other embodiments, the input device 22 is not directly accessed by the requestor 24. For example, the input device 22 communicates with a mobile station 28, such as a smart phone, carried by the requestor 24 and the mobile station serves as a user interface allowing the requestor 24 to place a call or make a request for elevator service. There are known ways in which a mobile station can be used to place a request for elevator service and some embodiments include such known techniques.

An elevator controller 30 receives any requests for elevator service that are received by or placed through the input device 22 and assigns one of a plurality of elevator cars 32 to provide the requested elevator service. The elevator controller 30 includes a processor 34 that is configured to avoid duplicate requests from an individual requestor 24. The processor 34 is configured to determine whether the requestor 24 already has a pending request for elevator service at the time that any request from that requestor 24 is received by or through the input device 22. The processor 34 has associated memory 36 that contains information regarding pending requests for elevator service.

Each request has identification information associated with it that distinguishes between different requestors of elevator service. The identification information need not identify an individual by name, for example, but does include some distinctive identification information so that one requestor is distinguishable from another.

Determining the identity of the requestor can be accomplished in various ways. In some embodiments the input device 22 includes a card reader or RFID communication capability for receiving requestor identification information. In other embodiments, the input device 22 will prompt a requestor to enter user information, such as a personal identification number. Biometric identifications are useful in some embodiments, such as fingerprint or facial recognition. In other embodiments, a mobile station identifier from the mobile station 28 may be used as the requestor identification.

In some embodiments, the processor 34 is a dedicated computing device that analyzes service requests or calls for purposes of determining whether there is already a pending request from a particular requestor 24 who has just placed a service request. In some embodiments, the processor 34 is also configured to assign an elevator car 32 to service a particular request using a known dispatching algorithm, for example. In some embodiments, the processor 34 is realized through a portion of an elevator system controller that controls dispatching and elevator system operation. The elevator controller 30 may be a group controller or realized through a set of elevator car controllers. In some embodiments, the elevator controller 30 is part of a cloud-based computing system. Given this description, those skilled in the art will realize what type of computing device configuration and processing requirements are needed for their particular implementation.

Figure 3:
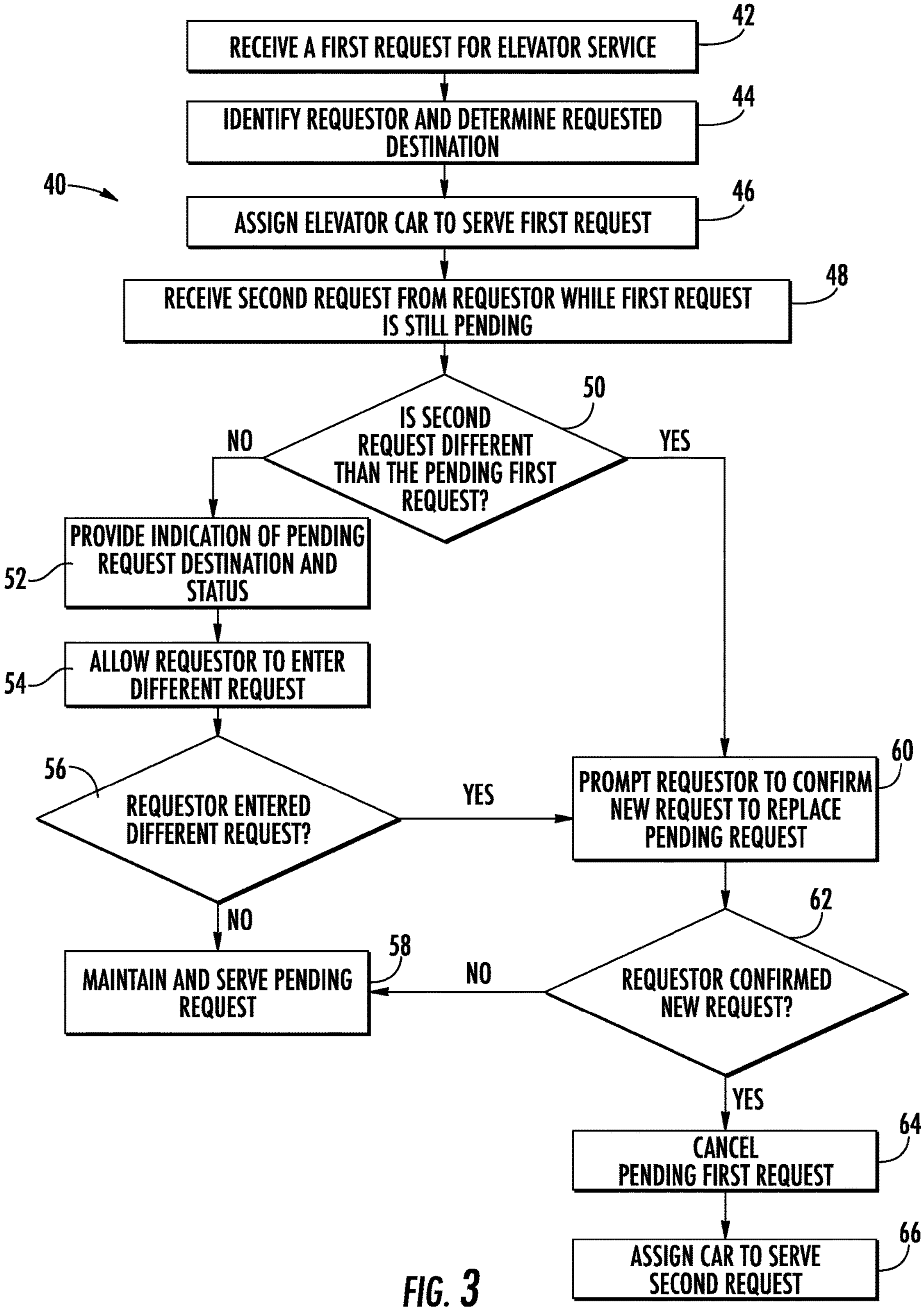
FIG. 3 is a flowchart diagram summarizing an example approach for handling multiple calls from an individual.

FIG. 3 is a flowchart diagram 40 that summarizes an example approach to determining whether a requestor desires elevator service corresponding to a second request or a previously placed and still pending request. As shown in FIG. 3, at 42 a first request for elevator service is received from a requestor 24. At 44, the processor 34 identifies the requestor 24 and determines the intended destination. At 46, the elevator controller 30 assigns one of the elevator cars 32 to serve the first request.

The first request is considered a pending request as long as the elevator car 32 that has been assigned to the first request has not yet arrived at the boarding location or landing where the requestor 24 will board the assigned elevator car 32. The first request may be considered to be still pending up until the time the assigned elevator car 32 closes its doors prior to departing from the boarding location.

In FIG. 3, the input device 22 receives a second request from the requestor 24 while the first request is still pending at 48. The processor 34 identifies the requestor 24 and determines the intended destination of the second request and, at 50, determines whether the second request is different than the first request. The processor 34 makes this determination, for example, by comparing the departure location where the requestor would board an elevator car of each request and the intended destination of each request.

Assuming the second request and the pending first request are the same, the processor 34 causes the input device 22 to provide an indication of the destination and status of the pending request at 52. The status may include, for example, an indicator of an assigned elevator car. Additional status information may include a current status of the assigned car, such as arriving at the landing or an estimated time of arrival at the landing where the requestor can board the elevator car.

At 54, the processor 34 causes the input device 22 to prompt the requestor to enter a different request if the requestor no longer wants the elevator service of the first and second request. In some embodiments, the prompt provided at 54 includes an option for the requestor to confirm the first request. A decision is made at 56 whether the requestor enters a different request. Assuming the requestor does not provide any indication of a different request, at 58 the processor 34 maintains and serves the pending first request. The second request is effectively ignored under these circumstances.

One scenario in which a requestor may enter a duplicate request is when that individual desires a reminder about which elevator car has been assigned to the first request. Another example scenario in which the same request may be entered as a second request while the first request is still pending is if the individual is unsure whether an assigned elevator car has already arrived and then departed while that individual was unable to board the elevator car. With the disclosed example approach, only one of the duplicate first and second requests is served and only one elevator car assignment is made by the controller 30, which improves elevator car assignment efficiency and space allocation.

In some instances, the second request will be different than the pending request. If so, the determination made at 50 yields a positive result. In that case, the processor 34 communicates with the input device 22 to prompt the requestor 24 to confirm the second request to replace the pending first request at 60. This same prompting occurs in the example of FIG. 3 when the processor 34 determines at 56 that the requestor entered a different request. At 62, the processor 34 determines whether the requestor confirms the second request. If not, the processor 34 maintains and causes the elevator system 20 to serve the pending first request at 58.

In the event that the determination at 62 indicates that the requestor 24 confirmed the second request, the elevator controller 30 cancels the pending first request at 64 and assigns an elevator car 32 to serve the second request at 66.

The determinations at 56 and 60 in FIG. 3 are example ways of determining which request corresponds to the elevator service desired by the requestor 24. Rather than simply making another car assignment in response to the second request, the processor 34 avoids an unnecessary car assignment and the elevator controller 30 controls the elevator system 20 to provide elevator service corresponding to only one of the first request or the second request.

The disclosed example embodiment addresses the situation in which an individual requestor places more than one request for elevator service. The system avoids attempting to provide elevator service for duplicate or unintended calls. By recognizing when a requestor already has a pending request, the system is capable of confirming the requestor's intentions and only providing the actual elevator service desired by the requestor instead of assigning cars for providing service for more than one call by the same individual.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of controlling an elevator system, the method comprising:

- receiving a first request for elevator service from a requestor;
- receiving a second request for elevator service from the requestor while the first request is still pending;
- assigning an elevator car to service the first request before receiving the second request; and
- controlling the elevator system to provide elevator service for only one of the first request or the second request; and determining whether the first request is still pending when receiving the second request by determining whether elevator car assigned to service the first request has arrived at a boarding location of the requestor.

2. The method of claim 1, comprising

- determining whether the first request or the second request corresponds to a desired elevator service of the requestor; and
- controlling the elevator system to provide the desired elevator service of the requestor.

3. A method of controlling an elevator system, the method comprising:

- receiving a first request for elevator service from a requestor;
- receiving a second request for elevator service from the requestor while the first request is still pending;
- controlling the elevator system to provide elevator service for only one of the first request or the second request;
  - determining whether the first request or the second request corresponds to a desired elevator service of the requestor; and
- controlling the elevator system to provide the desired elevator service of the requestor, wherein the determining comprises
  - determining whether the elevator service of the second request is different than the elevator service of the first request; and
  - either
  - identifying the first request as the request that corresponds to the desired elevator service when the elevator service of the second request is the same as the elevator service of the pending request,
  - or
  - obtaining additional input from the requestor identifying the desired elevator service.

4. The method of claim 3, wherein obtaining additional input from the requestor comprises

- prompting the requestor to indicate a selection of the elevator service of the first request or the elevator service of the second request; and
- determining the desired elevator service based on the requestor making the selection.

5. The method of claim 3, wherein the elevator service of the second request is the same as the elevator service of the first request and the method comprises providing a confirmation for the requestor that confirms at least one characteristic of the first request.

6. The method of claim 5, wherein the at least one characteristic includes an indication of a destination and an indication of an elevator car assigned to the first request.

7. A method of controlling an elevator system, the method comprising:

receiving a first request for elevator service from a requestor;

receiving a second request for elevator service from the requestor while the first request is still pending;

controlling the elevator system to provide elevator service for only one of the first request or the second request; determining whether the first request or the second request corresponds to a desired elevator service of the requestor; and controlling the elevator system to provide the desired elevator service of the requestor, wherein the determining comprises prompting the requestor to select the elevator service corresponding to the second request or the first request; and determining which elevator service the requestor selects in response to the prompting.

8. The method of claim 7, wherein the elevator service of the second request is different than the elevator service of the first request.

9. The method of claim 1, wherein the second request is submitted subsequent to the first request by the same requestor while the first request is pending.

10. An elevator system, comprising:

at least one input device configured to receive requests for elevator service; and an elevator controller that is configured to determine that the at least one input device has received a first request for elevator service from a requestor;

determine that the at least one input device has received a second request for elevator service from the requestor while the first request is still pending; and control the elevator system to provide elevator service for only one of the first request or the second request;

wherein the elevator controller is configured to determine whether the first request or the second request corresponds to a desired elevator service of the requestor, and control the elevator system to provide the desired elevator service of the requestor; and wherein the elevator controller is configured to determine the desired elevator service by prompting the requestor through the at least one input device to select the elevator service corresponding to the second request or the first request, and determining which elevator service the requestor selects in response to the prompting.

11. The elevator system of claim 10, wherein the elevator controller is configured to determine whether the first request or the second request corresponds to the desired elevator service of the requestor; and control the elevator system to provide the desired elevator service of the requestor.

12. The elevator system of claim 10, wherein the elevator service of the second request is different than the elevator service of the first request.

13. The elevator system of claim 10, wherein the elevator controller is configured to identify the requestor of the first and second request, respectively, based on identification information associated with the first and second request, respectively; and receive the identification information as a prerequisite to the requestor being able to make the first request and the second request, respectively.

14. The elevator system of claim 13, wherein the elevator controller is configured to assign an elevator car to service the first request before receiving the second request; and determine whether the first request is still pending when receiving the second request by determining whether elevator car assigned to service the first request has arrived at a boarding location of the requestor.

15. The elevator system of claim 10, wherein the second request is submitted subsequent to the first request by the same requestor while the first request is pending.

16. An elevator system, comprising:

at least one input device configured to receive requests for elevator service; and an elevator controller that is configured to determine that the at least one input device has received a first request for elevator service from a requestor;

determine that the at least one input device has received a second request for elevator service from the requestor while the first request is still pending; and control the elevator system to provide elevator service for only one of the first request or the second request;

wherein the elevator controller is configured to determine whether the first request or the second request corresponds to a desired elevator service of the requestor;

control the elevator system to provide the desired elevator service of the requestor;

determine whether the elevator service of the second request is different than the elevator service of the first request; and either identify the first request as the request that corresponds to the desired elevator service when the elevator service of the second request is the same as the elevator service of the pending request, or obtain additional input from the requestor identifying the desired elevator service.

17. The elevator system of claim 16, wherein the elevator controller is configured to obtain additional input from the requestor by prompting the requestor through the at least one input device to indicate a selection of the elevator service of the first request or the elevator service of the second request; and determine the desired elevator service based on the requestor making the selection.

18. The elevator system of claim 16, wherein the elevator service of the second request is the same as the elevator service of the first request and the at least one input device is configured to provide a confirmation for the requestor that confirms at least one characteristic of the first request.

19. The elevator system of claim 18, wherein the at least one characteristic includes an indication of a destination and an indication of an elevator car assigned to the first request.

20. A method of controlling an elevator system, the method comprising:

receiving a first request for elevator service from a requestor;

receiving a second request for elevator service from the requestor while the first request is still pending;

identifying the requestor of the first and second request, respectively, based on identification information associated with the first and second request, respectively; and receiving the identification information as a prerequisite to the requestor being able to make the first request and the second request, respectively; and controlling the elevator system to provide elevator service for only one of the first request or the second request.

* * * * *